United States Patent [19]

Mishima et al.

[11] Patent Number: 5,395,874
[45] Date of Patent: Mar. 7, 1995

[54] FLAME RETARDANT RESIN COMPOSITION

[75] Inventors: Ikuhiro Mishima, Kakogawa; Rika Munakata, Kobe; Mamoru Ishida, Settsu, all of Japan

[73] Assignee: Kanegafuchi Kagaku Kogyo Kabushiki Kaisha, Osaki, Japan

[21] Appl. No.: 52,686

[22] Filed: Apr. 27, 1993

[30] Foreign Application Priority Data

Apr. 30, 1992 [JP] Japan .................. 4-139953

[51] Int. Cl.⁶ .................. C08J 5/10; C08K 3/10; C08L 25/04
[52] U.S. Cl. .................. 524/409; 524/109; 524/110; 524/114; 524/334; 524/339; 524/341; 524/372; 524/373; 524/411; 524/412; 524/467
[58] Field of Search .............. 524/109, 110, 114, 334, 524/339, 341, 372, 373, 409, 411, 412, 467

[56] References Cited

U.S. PATENT DOCUMENTS

| | | | |
|---|---|---|---|
| 4,780,496 | 10/1988 | Termine et al. | 524/373 |
| 4,879,329 | 11/1989 | Hongo et al. | 524/114 |
| 5,250,590 | 10/1993 | Nakai et al. | 523/435 |

Primary Examiner—Paul R. Michl
Assistant Examiner—U. K. Rajguru
Attorney, Agent, or Firm—Armstrong, Westerman, Hattori, McLeland & Naughton

[57] ABSTRACT

A flame retardant resin composition which includes 100 weight parts of a rubber-reinforced styrene-based resin, 2~35 weight parts of an epoxy-oligomer of tetrabromobisphenol-A (A1), 2~35 weight parts of bis-(tribromophenoxy)ethane (A2), 1~15 weight parts of antimony trioxide (B), and 0.1~10 weight parts of chlorinated polyethylene (C), wherein the total of the above (A1), (A2), (B) and (C) are 8~50 weight parts and the weight ratio of (A1)/(A2) is 10/90~75/25. The composition of the present invention has well-balanced flame retardance and impact resistance.

3 Claims, No Drawings

FLAME RETARDANT RESIN COMPOSITION

BACKGROUND OF THE INVENTION

1. Field of the Invention

The present invention relates to a flame retardant rubber-reinforced styrene-based resin composition having an excellent impact resistance.

2. Description of the Prior Art

Recently, with various laws and regulations for fire prevention, a flame retardant rubber-reinforced styrene-based resin represented by an acrylonitrile-butadiene-styrene-based copolymer (hereafter abbreviated as ABS resin) has widely been used in fields such as domestic electrical appliances and office-automation devices.

As a method for imparting flame retardance to the rubber-reinforced styrene-based resin, the combined use of a bromine flame retardant and antimony trioxide is known, wherein, depending on necessary flame retardance and mechanical property, the type and quantity of the bromine flame retardant and the quantity of antimony trioxide have been selected, but there has been a problem that the elevation of flame retardance lowers the mechanical property.

To elevate flame retardance, as a bromine flame retardant, the combination of a carbonate oligomer of tetrabromobisphenol-A and tetrabromobisphenol-A (Japanese non-examined Patent Publication No. 60-192761), or the combination of a carbonate oligomer of tetrabromobisphenol-A, tetrabromobisphenol-A and polydibromophenyleneoxide (Japanese non-examined Patent Publication No. 58-38746) have been proposed.

Though by these methods the flame retardance was elevated, there was a drawback that the impact resistance, particularly the surface impact resistance important in practical use, was lowered.

SUMMARY OF THE INVENTION

An object of the present invention is to solve the above defect and provide a flame retardant rubber-reinforced styrene-based resin composition having an excellent impact resistance.

Other objects and advantages of the present invention will be apparent to one skilled in the art from the following detailed description.

The inventors of the present invention have assiduously made studies to attain the above object, and as the results, they have found that the combination as flame retardants of an epoxy-oligomer of tetrabromobisphenol-A and bis-(tribromophenoxy)ethane together with the combination of antimony trioxide and a chlorinated polyethylene surprisingly elevates the flame retardance without lowering impact resistance.

DETAILED DESCRIPTION OF THE INVENTION

The present invention provides a flame retardant resin composition which comprises 100 weight parts of a rubber-reinforced polystyrene-based resin, 2~35 weight parts of an epoxy-oligomer of tetrabromobisphenol-A (A1), 2~35 weight parts of bis-(tribromophenoxy)ethane (A2), 1~15 weight parts of antimony trioxide (B), and 0.1~10 weight parts of a chlorinated polyethylene (C), wherein the total of the above (A1), (A2), (B) and (C) are 8~50 weight parts and the weight ratio of (A1)/(A2) is 10/90~75/25.

As the rubber-reinforced styrene-based resin used in the invention, there is included a resin obtained by the graft polymerization of at least one compound selected from the group consisting of aromatic vinyl compounds, vinyl cyanide compounds, acrylic esters and methacrylic esters in the presence of a rubber-like polymer, or a resin mixed the polymer obtained by polymerization of at least one compound selected from the group of the above compounds with the above graft polymer.

As the above rubber-like polymer, there are included rubber-like dienepolymers such as polybutadiene rubber and butadiene-styrene-based rubber (SBR), ethylene-propylene copolymers, ethylene-propylene-diene copolymers, and acrylic rubbers containing an acrylic ester as a main component. They are used singly or in combination of two or more.

As the rubber-reinforced styrene-based resin used in the present invention, there are included ABS resins or acrylonitrile-ethylene-propylene-styrene-based copolymers, which is suitable in processability, impact resistance and heat resistance. If addition heat resistance is necessary, the polymer may be further copolymerized with α-methylstyrene or phenylmaleimide, or may be mixed with a resin obtained by the copolymerization thereof. Further, in view of heat stability, the residue of a sulfur chain transfer agent in the rubber-reinforced styrene-based resin is preferably not more than 0.25 weight %, more preferably not more than 0.15 weight %.

As a polymerization method, any of emulsion polymerization, suspension polymerization, solution polymerization or block polymerization may be used.

As the epoxy-oligomer (A1) of tetrabromobisphenol-A (hereafter abbreviated as TBA), there are compounds represented by the general formula (I)

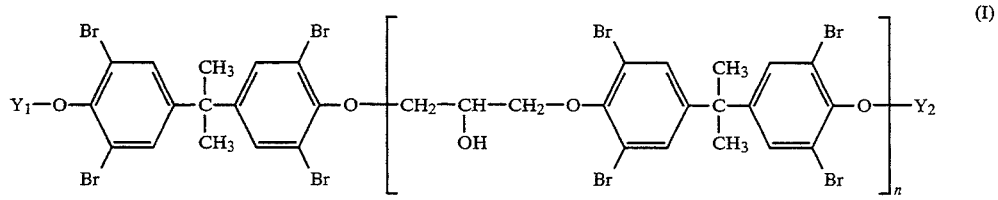

wherein $Y_1$ and $Y_2$ are shown by the following general formula of either (II) or (III)

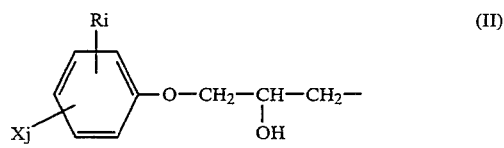

-continued

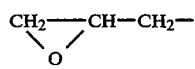
(III)

wherein X is a bromine atom or a chlorine atom, R is a lower alky group, i is an integer of 0 or 1~4, j is an integer of or 1~5, i+j is not more than 5, and n is an integer. In view of heat stability, in the epoxy-oligomer of TBA, it is preferable that either of $Y_1$ or $Y_2$ (one-end termination) or the both of $Y_1$ and $Y_2$ (both-end termination) in the general formula (I) are terminated by the general formula (II) and the number average molecular weight is 1000~25000.

The quantity used of the epoxy-oligomer of TBA is 2~35 weight parts, preferably 5~30 weight parts, to 100 weight parts of the rubber-reinforced styrene-based resin. The more quantity used of the epoxy-oligomer of TBA, the higher flame retardance, but, in view of impact resistance, it is preferably not more than 35 weight parts.

A flame retardant effective for the present invention in the combined use with the epoxy-oligomer(A1) of TBA is bis(tribromophenoxy)ethane (A2). Bis-(tribromophenoxy)ethane is 2~35 weight parts, preferably 5~30 weight parts, to 100 weight parts of the rubber-reinforced styrene-based resin. The more quantity used of bis-(tribromophenoxy)ethane, the higher the flame retardance, but if the quantity used exceeds more than 35 weight parts the heat resistance is remarkably lowered.

With respect to the use ratio of the epoxy-oligomer of TBA (A1) and bis-(tribromophenoxy) ethane (A2), (A1)/(A2) weight ratio is 10/90~75/25, preferably 15/85~70/30, in view of the flame retardance and impact resistance.

The antimony trioxide used in the present invention is an essential component to give flame retardance effectively. The quantity used of the antimony trioxide is 1~15 weight parts, preferably 3~12 weight parts, to 100 weight parts of the rubber-reinforced styrene-based resin. The antimony trioxide has a synergistic effect with bromine flame retardants, and the quantity used of $\frac{1}{8}$~$\frac{1}{2}$, preferably 1/6~1/2.5 of the above bromine flame retardants is efficient.

In view of the flame retardance and impact resistance, the antimony trioxide having an average particle size of not more than 2 μm, preferably not more than 1.5 μm is used. Further, in view of heat stability, the sulfur content in the antimony trioxide of not more than 0.02 weight %, preferably not more than 0.01 weight %, is suitable.

The chlorinated polyethylene in the present invention is an essential component to give the higher flame retardance and impact resistance. As the chlorinated polyethylene, a compound of chlorine content of preferably 10~45 weight %, more preferably 15~40 weight %, and of weight average molecular weight of preferably 10000~400000, more preferably 30000~300000, is used. The quantity used of the chlorinated polyethylene is 0.1~10 weight parts, preferably 0.5~8 weight parts, to 100 weight parts of the rubber-reinforced styrene-based resin. The more quantity used, the higher flame retardance and impact resistance, but the quantity used more than 10 weight parts remarkably lowers heat resistance.

The flame retardant resin composition of the present invention comprising 100 weight parts of the rubber-reinforced styrene-based resin and 8~50 weight parts of the total of the component(A1) epoxy-oligomer of TBA, the component(A2) bis- (tribromophenoxy) ethane, the component (B) antimony trioxide and the component(C) chlorinated polyethylene has high flame retardance. The total of (A1), (A2), (B) and (C) of less than 8 weight parts causes insufficient flame retardance, and that of more than 50 weight parts remarkably lowers impact resistance. Only the composition containing the component(A1) epoxy-oligomer of TBA, the component(A2) bis-(tribromophenoxy)ethane, the component(B) antimony trioxide and the component(C) polyethylene chloride is capable of having high impact resistance together with ~high flame retardance with reducing the quantity used of flame retardant.

The flame retardant resin composition of the present invention is obtained by blending the rubber-reinforced styrene-based resin in powder or pellet state, (A1) epoxy-oligomer of TBA, (A2)bis-(tribromophenoxy)ethane, (B) antimony trioxide and (C) chlorinated polyethylene, whose bending operation is not specially restricted. For example, it is easily produced by a roll, Bunbury-mixer or extruder.

In the flame retardant resin composition of the present invention, normally well-known antioxidants, heat stabilizers and lubricants may be used as a matter of course, and, if required, UV absorbants, pigments, anti-electrostatic agents, and flame retardants and flame retardant aids besides the above may be contained singly or in combination. Particularly, phenol anti-oxidants, phosphite stabilizers, hindered-amine stabilizers, benzotriazole stabilizers, tin stabilizers and lead stabilizers used for styrene-based resins, and internal and external lubricants such as various fatty acid esters, fatty acid amides, metal soaps and waxes may be used to make the flame retardant resin composition of the present invention more excellent as a molding resin.

The present invention will be explained in more detail by way of examples, but the invention is not restricted thereto. In the examples, "part" indicates weight parts, and "%" indicates weight %.

EXAMPLE 1

(1) Synthesis of rubber-reinforced styrene-based resin (ABS-1)

Into a reactor equipped with a stirrer and a cooler, the following substances were charged in a stream of nitrogen gas.

| | |
|---|---|
| Water | 250 parts |
| Polybutadiene rubber | 18 parts |
| Sodium rosinate | 1.0 part |

After the above mixture was heated and stirred at 70° C. in a stream of nitrogen gas, a mixture of 49 parts of styrene-based, 33 parts of acrylonitrile, 0.1 part of cumene hydroperoxide as a polymerization initiator and a mixture of 0.7 part of terpinolene and 0.2 part of tertiary-dodecyl mercaptan as polymerization modifiers, and an aqueous solution of 0.2 part of sodium formaldehyde sulfoxylate, 0.004 part of ferrous sulfate, 0.04 part of disodium ethylenediamine tetraacetate and 50 parts of water were added dropwise continuously over a period of 5 hours. After finishing dropping, stirring was further continued at 70° C. for 1 hour to complete the polymerization.

To the latex thus obtained, a phenol antioxidant was added, and after coagulation with an aqueous calcium chloride solution, washing with water, dehydration and drying, a rubber-reinforced styrene-based resin (ABS-1) powder was obtained. The quantity of free tertiary-dodecyl mercaptan in the rubber-reinforced styrene-based resin powder was 0.05 weight % by gas chromatography.

(2) Production of flame retardant resin composition

The rubber-reinforced styrene-based resin (ABS-1) obtained by the above (1), an epoxy-oligomer of TBA (EO-1), bis-(tribromophenoxy)-ethane, antimony trioxide (SB-1) and a chlorinated polyethylene were blended at the ratio in Table 1 by a super-mixer to prepare pellets by a 40 mm extruder.

From the pellets, test pieces were molded by a 5 ounce injection molding machine under the conditions of a screw rotation of 80 rpm and a nozzle temperature of 190° C.

and classification is divided into the V-0 class in case of the average combustion seconds being not more than 5 seconds and the maximum combustion seconds being not more than 10 seconds, the V-1 class in case of the average combustion seconds being not more than 25 seconds and the maximum combustion seconds being not more than 30 seconds, and the V-2 class in case of the average combustion seconds being not more than 25 seconds, the maximum combustion seconds being not more than 30 seconds and dropping substances set cotton on fire being present.

The heat stability was visually evaluated and divided into five levels by the degree of discoloration of a resin after retention for 30 minutes at 230° C. by using the above molding machine. The larger figures, the less discoloration.

From the results of Table 1 and 2, the flame retardance resin compositions represented by examples are particularly excellent in flame retardance and impact resistance.

TABLE 1

| | | Resin compositions | | | | | | | | Properties | | | |
|---|---|---|---|---|---|---|---|---|---|---|---|---|---|
| | | Rubber-reinforced styrene based resin (ABS resin) | | (A1) Epoxy-oligomer of TBA | | (A2) Bis(tri-bromoph-enoxy)ethane | (B) Antimony trioxide | | (C) Chlorinated polyethylene | Flame retardance | | Impact resistance Kgm | Heat stability |
| | | ABS-1 residual t-Dsh 0.05% | ABS-2 residual t-Dsh 0.31% | EO-1 M = 30000 | EO-2 M = 6000 | | SB-1 S-content 0.002% | SB-2 S-content 0.11% | | Class | Maximum combustion seconds (sec) | | |
| Examples | 1 | 100 | — | 7 | — | 15 | 8 | — | 5 | V-0 | 5.4 | 5.4 | 5 |
| | 2 | 100 | — | 4 | — | 18 | 8 | — | 5 | V-0 | 6.5 | 5.8 | 4 |
| | 3 | 100 | — | 10 | — | 12 | 8 | — | 5 | V-0 | 4.6 | 5.1 | 5 |
| | 4 | — | 100 | — | 7 | 15 | — | 8 | 5 | V-0 | 4.9 | 4.0 | 2 |
| Comp. Examples | 1 | — | 100 | — | 22 | — | — | 8 | — | V-1 | 12.6 | 0.8 | 2 |
| | 2 | — | 100 | — | — | 22 | — | 8 | — | V-1 | 16.7 | 2.8 | 2 |
| | 3 | — | 100 | — | — | 22 | — | 8 | 5 | V-1 | 10.6 | 3.8 | 1 |

TABLE 2

| | | Resin compositions | | | | | | | | Properties | | | |
|---|---|---|---|---|---|---|---|---|---|---|---|---|---|
| | | Rubber-reinforced styrene based resin (ABS resin) | | (A1) Epoxy-oligomer of TBA | | (A2) Bis(tri-bromoph-enoxy)ethane | (B) Antimony trioxide | | (C) Chlorinated polyethylene | Flame retardance | | Impact resistance Kgm | Heat stability |
| | | ABS-1 residual t-Dsh 0.05% | ABS-2 residual t-Dsh 0.31% | EO-1 M = 30000 | EO-2 M = 6000 | | SB-1 S-content 0.002% | SB-2 S-content 0.11% | | Class | Maximum combustion seconds (sec) | | |
| Examples | 5 | 100 | — | 7 | — | 5 | 4 | — | 2 | V-2 | 19.5 | 6.4 | 5 |
| | 6 | — | 100 | — | 7 | 5 | — | 4 | 2 | V-2 | 27.5 | 5.0 | 3 |
| Comp. Examples | 4 | — | 100 | — | 12 | — | — | 4 | — | Beyond standard | 34.5 | 1.3 | 2 |
| | 5 | — | 100 | — | — | 12 | — | 4 | — | Beyond standard | 60 < | 4.2 | 2 |

EXAMPLES 2~6

Comparative Examples 1~5

In the same manner as in the above Example 1, flame retardant resin compositions shown in Table 1 and 2 and those test pieces were prepared. The rubber-reinforced styrene-based resin (ABS-2) was prepared by the same composition and method as in Example 1, except the single use of 0.9 part of tertiary-dodecyl mercaptan as a polymerization modifier. The quantity of tertiary-dodecyl mercaptan in the rubber-reinforced styrene-based resin (ABS-2) powder was 0.31 weight %.

The impact resistance was evaluated by a falling weight impact strength (50% destruction) test of a plate (150×100 mm) of 3 mm thick.

The flame retardance was evaluated based on the UL-94 standard. In the UL-94, 5 test pieces are used, (Note)

Epoxy-oligomer of TBA
 EO-1: number average molecular weight 30000, non-terminated type
 EO-2: number average molecular weight 6000, one-end terminated type Antimony trioxide
 SB-1: average particle size 0.5 μm, S-content 0.002 weight %
 SB-2: average particle size 0.5 μm, S-content 0.11 weight %

Chlorinated polyethylene

ELASLENE 351A (manufactured by Showa Denko K.K., chlorine content: 35 weight %)

t-Dsh: tertiary-dodecyl mercaptan

M: number average molecular weight

As mentioned above, the flame retardant resin composition of the present invention has well-balanced flame retardance and impact resistance.

What is claimed is:

1. A flame retardant resin composition which comprises 100 weight parts of a rubber-reinforced styrene-based resin, 2~35 weight parts of an epoxy-oligomer of tetrabromobisphenol-A (A1), 2~35 weight parts of bis(tribromophenoxy)ethane (A2), 1~15 weight parts of antimony trioxide (B), and 0.1~10 weight parts of chlorinated polyethylene (C), wherein the total of the above (A1), (A2), (B) and (C) are 8~50 weight parts and the weight ratio of (A1)/(A2) is 10/90~75/25.

2. A flame retardant resin composition of claim 1, wherein the residue of a sulfur chain transfer agent in the rubber-reinforced styrene-based resin is less than 0.25 weight %.

3. A flame retardant resin composition of claim 1 or 2, wherein the average particle size of the antimony trioxide is not more than 2 μm and the sulfur content is not more than 0.02 weight %.

* * * * *